United States Patent [19]
Lieffring

[11] 3,730,582
[45] May 1, 1973

[54] VEHICLE MODIFICATION FRONT END PORTION OF AN AUTOMOBILE

[75] Inventor: Gordon V. Lieffring, Kansas City, Mo.

[73] Assignee: Lieffring Industries, Incorporated, Kansas City, Mo.

[22] Filed: Sept. 13, 1971

[21] Appl. No.: 179,812

[52] U.S. Cl. ................. 296/28 R, 29/401, 296/1 R
[51] Int. Cl. ..................... B62d 25/08, B62d 65/00
[58] Field of Search .................. 296/1 R, 1 S, 26, 296/28 R; 29/401; D14/3 G, 6 B, 18 R, 18 A

[56] References Cited

UNITED STATES PATENTS

| 2,234,781 | 3/1941 | Schjolin | 296/28 R |
|---|---|---|---|
| D208,540 | 9/1967 | Joelson | D14/18 R |
| 2,059,305 | 11/1936 | Best | 296/1 S X |
| 2,380,031 | 7/1945 | Deisley et al. | 296/28 R |
| D213,291 | 2/1969 | Lee | D14/18 R |
| 3,338,617 | 8/1967 | Lockwood | 296/1 R |
| D110,049 | 6/1938 | Morrison | D14/18 A |

FOREIGN PATENTS OR APPLICATIONS

| 940,266 | 5/1948 | France | 296/28 R |
|---|---|---|---|
| 1,426,149 | 12/1965 | France | 296/26 |

Primary Examiner—Leo Friaglia
Assistant Examiner—Leslie J. Paperner
Attorney—Fishburn, Gold & Litman

[57] ABSTRACT

A modification for a front-end portion of a mobile vehicle, such as a 1970 and earlier "Volkswagen," and having a body with at least one door for each side thereof, front fenders, a windshield and a hood extending outwardly and downwardly in an arcuate path from adjacent a lower edge of the windshield wherein the modification includes a side panel for a forward portion of each side of the body and extending forwardly from adjacent the door in the respective side of the body and having a lower edge portion positioned between the body and a respective front fender and a front panel mounted on forward ends of the side panels and a hood member to replace the original hood and extending outwardly and generally horizontally from adjacent the lower edge of the windshield whereby the side panels and the hood member cooperate to enclose a space substantially larger than a space enclosed by the fenders and the original hood. The side panels each have an arcuate trough-shaped portion extending generally upwardly and rearwardly and outwardly from a front end thereof to direct wind upwardly and over and around the mobile vehicle.

4 Claims, 7 Drawing Figures

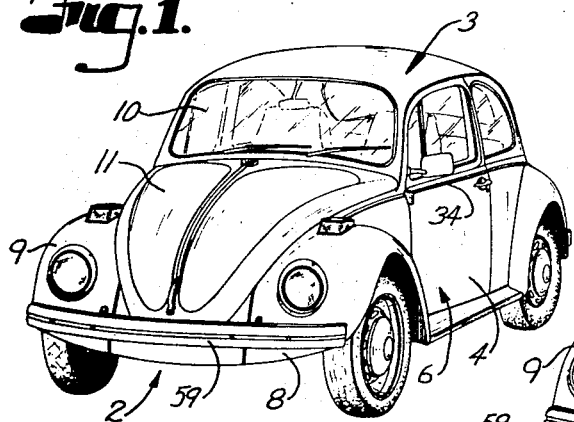
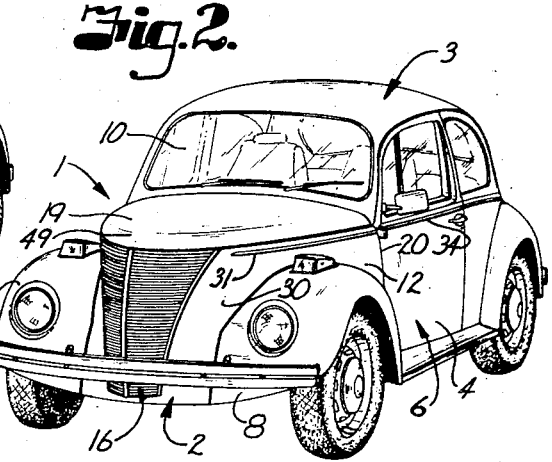
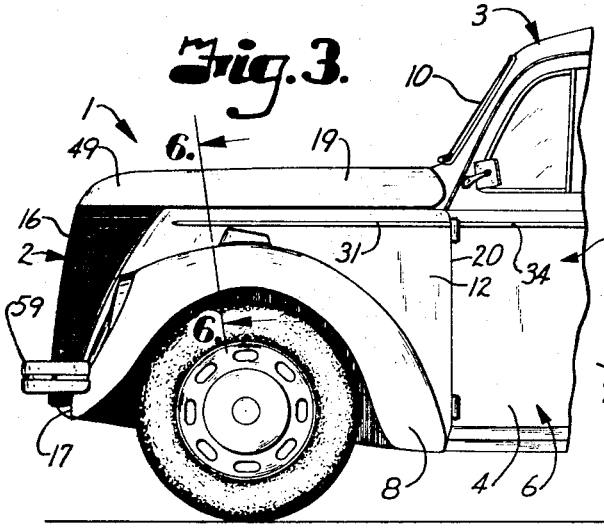
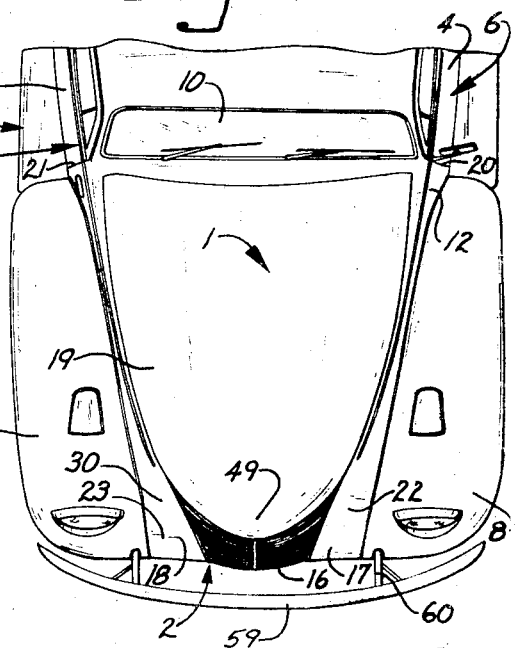
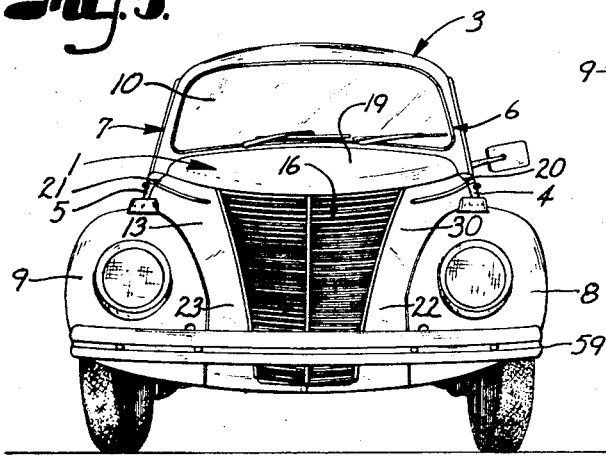
INVENTOR.
Gordon V. Lieffring

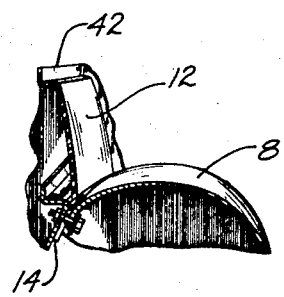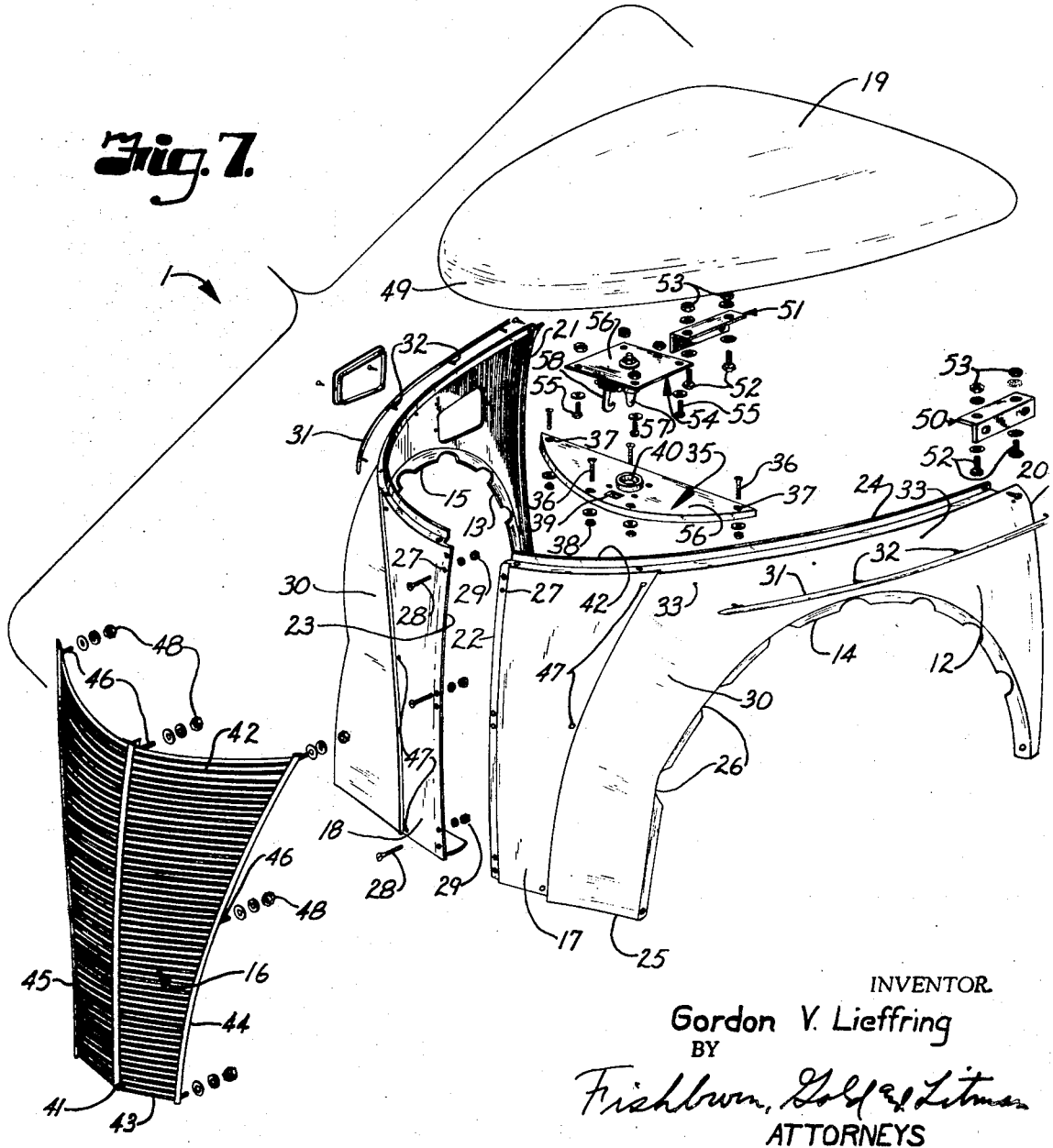

VEHICLE MODIFICATION FRONT END PORTION OF AN AUTOMOBILE

The present invention relates to self-propelled mobile vehicles and, more particularly, to a space-increasing and appearance modification for a front-end portion of an automobile.

The principle objects of the present invention are: to provide a modification for a front-end portion of a mobile vehicle, such as a 1970 and earlier "Volkswagen," having an arcuate hood extending outwardly and downwardly from adjacent a lower edge of windshield thereof to substantially change the appearance of the automobile; to provide such a vehicle modification having cooperating members positioned to enclose a substantially larger storage space therebetween than a space enclosed by the body and the original hood; to provide such a vehicle modification wherein the original components are simple to remove and the replacement components are simple to install and position; to provide such a vehicle modification having substantially improved wind-flow characteristics as effected by trough-shaped portions of replacement members to thereby move wind upwardly and outwardly and around and over the vehicle; to provide such a vehicle modification having an appearance which conveys an impression equivalent to that of substantially more expensive automobiles; and to provide such a vehicle modification which is economical to manufacture, durable in construction, simple to install, and particularly effective to improve the appearance and wind-flow characteristics of a forwardend portion of the automobile.

Other objects and advantages of this invention will become apparent from the following description taken in connection with the accompanying drawings wherein are set forth, by way of illustration and example, certain embodiments of this invention.

The drawings constitute a part of this specification and include an exemplary embodiment illustrating various objects and features of the vehicle modification of the present invention.

FIG. 1 is a perspective view of a mobile vehicle prior to modification of a front-end portion thereof.

FIG. 2 is a perspective view of the mobile vehicle having installed thereon a vehicle modification embodying features of the present invention.

FIG. 3 is a fragmentary side elevational view of the mobile vehicle and the modification thereof.

FIG. 4 is a plan view of a forward-end portion of the mobile vehicle and the modification thereof.

FIG. 5 is a front elevational view of the mobile vehicle and the modification thereof.

FIG. 6 is a transverse sectional view taken on Line 6—6, FIG. 3.

FIG. 7 is an exploded perspective view of components of the vehicle modification.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriate detailed structure.

In the disclosed embodiment of the present invention, the reference numeral 1 generally designates a vehicle modification for a front-end portion 2 of a mobile vehicle 3 having a body with doors 4 and 5 for respective sides 6 and 7 thereof, front fenders 8 and 9, a windshield 10 and an original hood 11 extending outwardly and downwardly in an arcuate path from adjacent a lower edge of the windshield 10. The vehicle modification 1 has component parts cooperating to enclose a space substantially larger than a space enclosed by the original hood 11 and the body of the mobile vehicle 3 and component parts of the vehicle modification 1 are shaped to direct wind upwardly and over and around the mobile vehicle 3.

The illustrated vehicle modification 1 includes side panels 12 and 13 for a forward portion of the sides 6 and 7 respectively of the body of the mobile vehicle 3 and the side panels 12 and 13 extend forwardly from adjacent the doors 4 and 5 in the respective sides 6 and 7 of the body and have lower edge portions 14 and 15 respectively positioned between the body and respective front fenders 8 and 9. A front panel 16 is mounted on forward or front portions 17 and 18 of the side panels 12 and 13 respectively and the original hood 11 and the hood member 19 extends outwardly and generally horizontally from adjacent a lower edge of the windshield 10 whereby the side panels 12 and 13 and the hood member 19 cooperate to enclose a space substantially larger than the space enclosed by the original hood 11 and the fenders 8 and 9.

The illustrated side panels 12 and 13 each extend forwardly from respective doors 4 and 5 and have rear ends 20 and 21 respectively positioned adjacent said doors 4 and 5 and forward ends 22 and 23 to be joined together, as later described. The side panels 12 and 13 each have upper edges 24 aligned in a plane extending outwardly and generally horizontally from a lower edge of the windshield 10 and lower edges 25 having the lower edge portions 14 and 15 thereof secured in position between a body and a respective front fender of the mobile vehicle 3.

The side panels 12 and 13 each have a cut-out portion generally conforming to the shape of the respective front fenders 8 and 9 and the lower edge portions 14 and 15 have notches 26 therein to permit suitable fastening members, such as bolts (not shown) to extend therethrough and to secure the side panels 12 and 13 in position between the body and a respective fender of the mobile vehicle 3.

The side panels 12 and 13 have front portions 17 and 18 generally normal to side portions thereof and the forward ends 22 and 23 of the side panels 12 and 13 are joined together to form a generally U-shaped member, as by suitable fastening devices, such as bolts 28 extending through apertures 27 adjacent the forward ends 22 and 23 and having suitable nuts 29 mounted thereon to hold the forward ends 22 and 23 together.

The forward portions 17 and 18 have offset portions adjacent the facing edges of the forward ends 22 and 23 respectively thereby defining a recess in the U-shaped member formed when the side panels 12 and 13 are joined together. The recess so formed is adapted to receive therein the front panel 16, as later described.

The offset portions and the forward portions 17 and 18 of the side panels 12 and 13 each curve generally rearwardly from the facing forward edges 22 and 23 and curve generally upwardly and rearwardly from the lower edge 25 thereof.

The forward portions 17 and 18 each have an arcuate trough-shaped portion 30 between the offset portion and the respective lower edge portion 14 and 15 and the trough-shaped portion 30 of the side panels 12 and 13 each extend generally upwardly and rearwardly and outwardly from the lower edge 25 of the forward portions 17 and 18 respectively thereof whereby the offset portions and the trough-shaped portions 30 of the side panels 12 and 13 cooperate with the hood member 19 to direct wind upwardly and over and around the mobile vehicle 3.

Suitable trim strips 31 are mounted on the side panels 12 and 13, as by having projections 32 extending therefrom to be received in apertures 33 in the side panels 12 and 13. The trim strips 31 preferably are extensions of and align with respective trim strips 34 mounted on the doors 4 and 5 of the mobile vehicle 3.

A latch plate 35 is suitably secured to the forward portions 17 and 18 of the side panels 12 and 13 after same have been joined together and in the illustrated structure, a plural of fastening members, such as bolts 36 extend through apertures 37 in the latch plate 35 and have nuts 38 mounted thereon to secure the latch plate 35 in clamping engagement with a suitable bracket or rib (not shown) extending from the forward portions 17 and 18 of the side panels 12 and 13. The latch plate 35 has a latch opening 39 therein and a positioning opening 40 therein to receive cooperating members on the hood member 19, as later described.

The front panel 16 is mounted on the forward portions 17 and 18 of the side panels 12 and 13 and in the recess formed by the offset portions thereof. The front panel 16 has a center portion 41 extending between upper and lower edges 42 and 43 respectively thereof and side portions 44 and 45 spaced from the center portion 41 and extending between the upper and lower edges 42 and 43. The front panel 16 has a plurality of vertically spaced, generally horizontally extending portions positioned between the center portion 41 and each of the side portions 44 and 45 thereby resembling a grill for an automobile.

The center portion 41 and the side portions 44 and 45 each have a plurality of spaced fastening members, such as threaded shafts 46, suitably mounted thereon to be received in respective apertures 47 in the forward portions 17 and 18 of the side panels 12 and 13 and having suitable nuts 48 mounted thereon to secure the front panel 16 on the side panels 12 and 13.

The front panel 16 is an arcuate member with the horizontally extending portions and the opposite side portions 44 and 45 thereof each curving generally rearwardly from the center portion 41 thereof and the front panel 16 corresponds in shape to adjacent portions of the forward portions 17 and 18 of the side panels 12 and 13 wherein the front panel 16 curves generally upwardly and rearwardly from the lower edge 43 thereof.

The hood member 19 is hingedly mounted on the body of the mobile vehicle 3 and has peripheral edges positioned above the upper edges 24 of the side panels 12 and 13 and the upper edge 42 of the front panel 16. The illustrated hood member 19 is generally U-shaped in plan and tapers forwardly from adjacent the lower edge of the windshield 10 and has an arcuate forward end 49 alignable with the upper edge of the forward portions 17 and 18 of the side panels 12 and 13 and the upper edge 42 of the front panel 16.

The hood member 19 is mounted on the original hinges (not shown) of the mobile vehicle 3 and hood hinge brackets 50 and 51 are suitably secured on a rear portion of the hood member 19 and adjacent opposite edges thereof, as by a plurality of suitable fastening members, such as screws or bolts. The brackets 50 and 51 are illustrated as angular members having one leg depending from the hood member 19 and adapted to be secured to the original hinge members, as by a plurality of bolts 52 having suitable nuts 53 mounted thereon.

A hood latch assembly 54 is suitably secured to the hood member 19, as by a plurality of suitable fastening members such as bolts or screws 55. The hood latch assembly 54 includes a plate member 56 having a positioning member 57 mounted on and depending therefrom to be received within the positioning opening 40 in the latch plate 35. A latch member 58 is mounted on the plate member 56 and is positioned to be received within the latch opening 39 of the latch plate 35 and is movable between a latching position and a release position. The latch structure preferrably is the same as on the original vehicle, operating in the same manner, only being in a different location.

Assembly and mounting of the vehicle modification 1 on the front end portion 2 of the mobile vehicle 3 includes removing the original hood from the front end portion 2 of the mobile vehicle 3 and removal of a front bumper 59 and mounting members 60 for mounting the front bumper 59 on the front end portion 2 of the mobile vehicle 3. Removal of the front wheels is optional; however, removal thereof may facilitate installation of the vehicle modification. The front fenders 8 and 9 are each loosened from the body of the mobile vehicle 3, as by loosening mounting bolts (not shown) therefor. The forward portions 17 and 18 of the side panels 12 and 13 are joined together at the forward ends 22 and 23 respectively thereof by the bolts 28 being positioned in the aperture 27 and the nuts 29 tightened thereon. The front panel 16 is then mounted on the forward portions 17 and 18 and secured in place with the threaded shafts 46 extending through the apertures 47 and having the nuts 48 secured thereon. The trim strips 31 are suitably secured on the side portions of the side panels 12 and 13, as by having the projection 32 extending through the apertures 33 therein and secured in position thereon. The latch plate 35 is secured in position on the forward portions 17 and 18 of the side panels 12 and 13 after same have been joined together. The lower edge portions 14 and 15 of the generally U-shaped member are mounted in a position between the respective sides of the mobile vehicle and respective front fenders 8 and 9. The fender welt is reinstalled between the fenders and the respective side panels 12 and 13 and the fastening members for the front fenders 8 and 9 are secured in place thereby mounting the fenders and the side panels 12 and 13 in position on the front end portion 2 of the mobile vehicle 3. The hood latch assembly 54 and the hood hinge brackets 50 and 51 are mounted on the hood member 19 which is then mounted on the original hinge members of the mobile vehicle 3 and positioned in alignment with the upper edges 24 of the side panels 12 and 13. The hood member 19 is preferably loosely mounted on the original hinges and the hood member 19 is then moved to a closed position and adjusted relative to the U-shaped member formed of the side panels 12 and 13. The hood member 19 is then opened and the hood secured in position to the hood hinge brackets 50 and 51. A suitable hood release cable (not shown) is connected to the hood latch assembly 54 for selectively moving the latch member 58 between a latch position and a release position. It is noted that structure and operation of the latch plate 35 and the hood latch assembly 54 is substantially similar to structure and operation of the original latch structure of "Volkswagens." The front bumper 59 and the mounting members 60 are replaced on the front end portion 2 of the mobile vehicle 3.

It is to be understood that while I have illustrated and described one form of my invention, it is not to be limited to the specific form or arrangement of parts herein described and shown.

What I claim and desire to secure by Letters Patent is:

1. A modification for a mobile vehicle having a body with a door for each side thereof and front fenders and a windshield and a hood extending forwardly from said windshield, said vehicle modification comprising:
   a. a side panel for each side of a body of a mobile vehicle and extending forwardly from adjacent a door in the respective side of the body of the mobile vehicle, said side panels each having an upper edge and a lower edge and a forward end and a rear end, said side panels each being positioned between the body and a respective front fender of the mobile vehicle and extending upwardly therefrom;
   b. said side panels each have a front portion;
   c. said front portions of said side panels have facing edges thereof joined together to form a generally U-shaped member;
   d. said front portions of said side panels each have an offset portion adjacent the facing edges thereof thereby defining a recess in the U-shaped member formed when the side panels are joined together;
   e. a front panel mounted on forward ends of the side panels;
   f. said front panel is mounted on the front portion of said side panels and has a plurality of vertically spaced generally horizontally extending portions;
   g. said front panel is mounted in the recess formed in the front portions of said side panels;
   h. a hood member hingedly mounted on the body of the mobile vehicle and having peripheral edges positioned above upper edges of said side panels and said front panel;
   i. means for securing said side panels and said front panel to the body of the mobile vehicle in a position having the upper edges thereof above a location of an original hood of the mobile vehicle whereby said side panels and said hood member cooperate to enclose a space substantially larger than a space enclosed by the original hood and fenders.

2. A vehicle modification as set forth in claim 1 wherein:
   a. said front panel has a center portion extending generally vertically;
   b. said front panel is an arcuate member with opposite side portions thereof each curving generally rearwardly from the center portion;
   c. said plurality of vertically spaced generally horizontally extending portions extend from said center portion substantially to said side portions providing an appearance of a grill.

3. A vehicle modification as set forth in claim 1 wherein:
   a. said front panel has a center portion extending generally vertically;
   b. said front panel is an arcuate member with opposite side portions thereof each curving generally rearwardly from the center portion;
   c. said side panels each have an arcuate trough-shaped portion between the offset portion and the respective front fender of the mobile vehicle; and
   d. said trough-shaped portions of said side panels each extend generally upwardly and rearwardly and outwardly from a front end thereof whereby said front panel and said trough-shaped portions of said side panels cooperate to direct wind upwardly and over and around the mobile vehicle.

4. A vehicle modification as set forth in claim 1 wherein:
   a. said offset portions of said side panels and said front panel mounted thereon each curve generally rearwardly from the facing edges of said side panels and generally upwardly and rearwardly from the forward end of said side panels;
   b. said hood member tapers forwardly from adjacent the lower edge of the windshield of the mobile vehicle to an arcuate forward end;
   c. said side panels each have an arcuate trough-shaped portion between the offset portion and the respective front fender of the mobile vehicle; and
   d. said trough-shaped portions of said side panels each extend generally upwardly and rearwardly and outwardly from a front end thereof whereby said front panel and said offset portions and said trough-shaped portions of said side panels and said hood member cooperate to direct wind upwardly and over and around the mobile vehicle.

* * * * *